March 25, 1947.  W. D. PARKER  2,417,945

HYDRAULICALLY CONTROLLED COWLING RING FOR AIRCRAFT

Filed May 5, 1944

INVENTOR
W. D. PARKER
BY *Hudson & Young*
ATTORNEYS

Patented Mar. 25, 1947

2,417,945

UNITED STATES PATENT OFFICE 2,417,945

HYDRAULICALLY CONTROLLED COWLING RING FOR AIRCRAFT

Will D. Parker, Bartlesville, Okla., assignor to Phillips Petroleum Company, a corporation of Delaware Application May 5, 1944, Serial No. 534,299

1 Claim. (Cl. 123—171)

This invention relates to a means for controlling the ventilation of aircraft and it has particular relationship to a ventilating cowling means for controlling the air flow around an aircraft engine and thereby controlling the temperature of said engine.

One object of this invention is to provide temperature control for an aircraft engine without adding parasitic resistance.

Another object is to provide a means for controlling the flow of air around an engine which is simple and positive in action and which fits in with the fine streamlining of the fuselage or nacelle at all times during its operation.

Another object is to provide a movable cylindrical cowling disposed to act as a valve controlling the flow of air around an aircraft engine.

Numerous other objects and advantages of my invention will be apparent to those skilled in the art upon reading the accompanying specification and claim and upon studying the drawings.

In the drawings

Many modern aircraft are provided with cowling flaps which may be adjusted to control the temperature of the engine. The patent to Duff, 2,124,333, of July 19, 1938, is representative of such present construction. Under certain flight conditions or when taxiing on the ground it is desirable to open the flaps as much as 15° to provide sufficient ventilation to keep the engine cool. In twin engine and multi-engine aircraft when one or more engines are inoperable it is necessary to open wide the cowling flaps on the engine or engines that are still running. Due to the high parasitic resistance of these open flaps, efficient operation of the engines that are still running is not possible, and if the flaps are closed to reduce the parasitic resistance, the engines immediately become hot, lose power and may have their pistons seize in the cylinder. These running engines may soon go out of operation because of said overheating.

In the devices of the prior art if a standard flap becomes loose at any point it may soon become damaged due to the vibration unless repaired. The standard flap also causes considerable friction and interference with the air stream passing over it. For example, the speed of a twin engine airplane is slowed as much as 7 M. P. H. when cruising at 180 M. P. H. with the flaps open as much as 14.5°.

As it is obvious that the invention may be applied to an engine in a nacelle out on a wing or to an engine mounted in the fuselage of an aircraft, I hereby define the word "nacelle" as generic to both nacelles and fuselages and when the word nacelle appears in the remainder of the specification and in the claim it is to be regarded as either a fuselage or a nacelle, regardless of whether they are designed to accommodate members of the crew, or passengers, or whether they do not provide for the presence of human beings.

Figure 1:
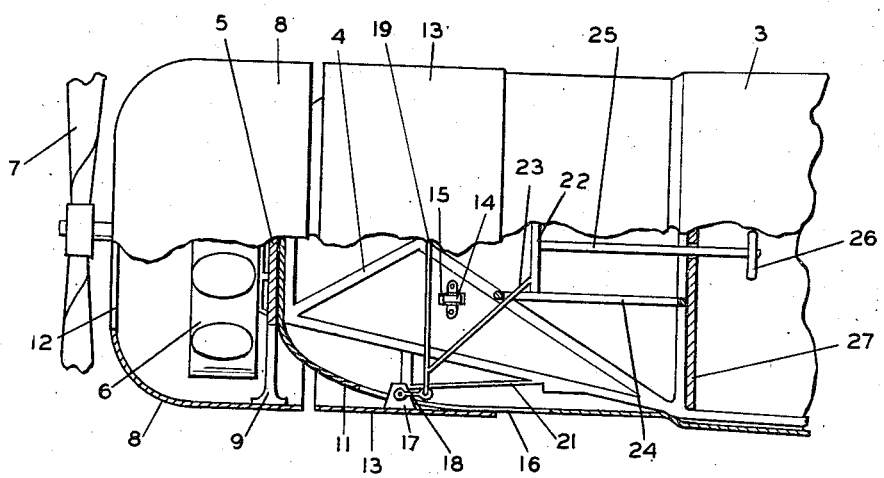
Figure 1 is an elevation view of the fuselage or nacelle of an aircraft embodying my invention with the movable cowling mounted on the nacelle or fuselage proper and with parts broken away to show details of construction.

In Figure 1, a nacelle 3 is provided with the usual internal framework 4. Framework 4 reinforces nacelle 3 and on framework 4 is mounted fire wall 5. Following the general construction, engine 6 is rigidly secured to fire wall 5 and the fire wall is in turn secured rigidly to framework 4. Engine 6 may be any known type of aircraft engine and drives propeller 7 by any known means.

Surrounding engine 6 is stationary cowling 8, which stationary cowling may be secured in the usual manner to fire wall 5 by braces 9.

As is customary in such aircraft construction nacelle 3 has a streamlined nose portion 11 disposed to provide a space between parts 11 and 8 for the passage of cooling air around the engine. The stationary cowling 8 is provided with a hole 12 in its central front portion and as the aircraft proceeds through the atmosphere the air stream created by the movement of the aircraft and by propeller 7 passes in hole 12 around motor 6 and out the space between parts 8 and 11. What has been described in the last three paragraphs in relation to Figure 1 is standard construction and it is to this standard construction that I have applied my invention which will now be described in detail.

In order to control the flow of air through hole 12 and between 8 and 11 I have provided a cylindrical sleeve 13. Sleeve 13 is mounted to slide easily on nacelle 3 from a forward position in which sleeve 13 substantially closes the space between 8 and 11 and back along nacelle 3 until the space between 8 and 11 is substantially unobstructed. In both extreme positions, the streamlined contour of the stationary cowling and the nacelle is substantially perfect, resulting in a minimum of parasitic drag, and in intermediate positions there is no interference with the air stream around the outside of the structure and very little or no interference of a parasitic nature caused by the projection of sleeve 13 into the space between 8 and 11.

The friction between cylindrical sleeve 13 and nacelle 3 may be reduced by such means as roller 14. Roller 14 is mounted on the inside of nacelle 3 and rotates relative to nacelle 13. A minor portion of roller 14 projects through opening 15 and contacts with sleeve 13. While only one roller 14 is shown, it is obvious that as many may be provided as found desirable and they may be arranged in rows or other suitable configurations. Obviously other antifriction means known to the art may be employed between sleeve 13 and nacelle 3 in place of roller 14.

Nacelle 3 is provided with slots 16 and secured to sleeve 13 and projecting through slot 16 are one or more, but preferably three or more, fins 17. Fins 17 provide means for moving sleeve 13 axially of nacelle 3 in combination with any desired movement producing means.

As shown in Figure 1, fins 17 have links 18 pivoted thereto and links 18 are in turn pivotally mounted on a ring 19. Ring 19 is maintained in upright position but it slides upon rods 21 which may be a portion, or may be mounted upon, framework 4. Ring 19 in turn may be secured to a ring or plate 22 by means of a plurality of rods 23. Ring or plate 22 may in turn be guided by rods 24 which may be mounted on, or be a part of, framework 4.

Ring or plate 22 may be moved axially of the nacelle by any suitable means and as an illustrated embodiment, rod 25 and handle 26 may be provided, rod 25 being shown as guided in a fire wall or instrument board or other part 27.

Figure 2:
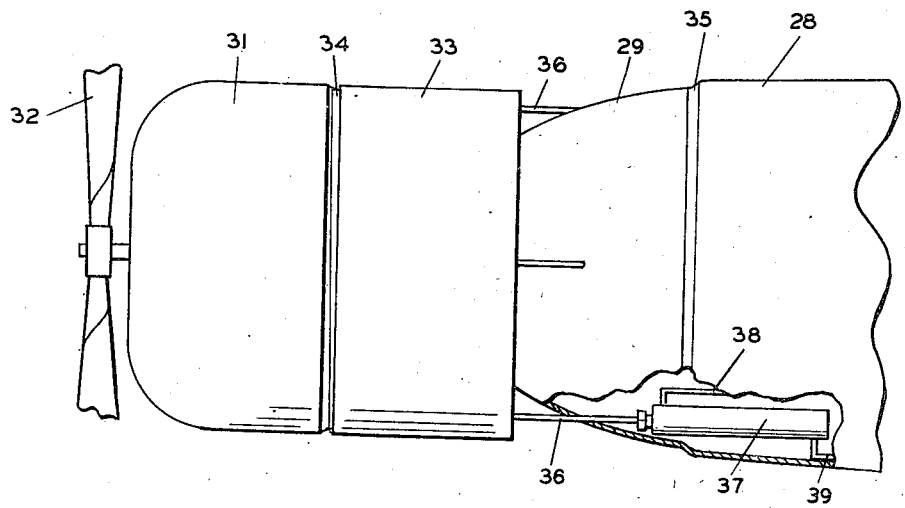
Figure 2 is a similar view of another aircraft embodying a modified form of my invention in which the movable cowling is mounted to slide relative to the stationary engine cowling.

In Figure 2, a nacelle 28 is shown having a streamlined nose portion 29 on the forward end of which is mounted an engine (not shown) and a stationary engine cowling 31 in the usual manner old in the art. The motor (not shown) may drive propellor 32 and stationary cowling 31 is provided with a central opening similar to 12 of Figure 1. The air stream passing in this opening passes back to the atmosphere between parts 29 and 31 and the amount of air returned is controlled by the movement of sleeve 33.

It will be noted in Figure 2 that cylindrical sleeve 33 is mounted by axial sliding movement on stationary cowling 31 and cowling 31 has an extended portion 34 telescoped in sleeve 33 so that when sleeve 33 is moved back into contact with 29 a streamlined exterior will be presented, and in all other portions a streamlined exterior will be presented except for the space between 33 and 29 out of which the air used in cooling the engine is exhausted. The result is substantial elimination of parasitic drag at all positions.

The usual antifriction device such as roller 14 may be employed between sleeves 33 and 34. Sleeve 33 has rods 36 attached thereto for moving the sleeve and rods 36 may be moved by any suitable means such as that already shown in Figure 1, but in Figure 2, I show a hydraulic cylinder 37 for moving each of rods 36. Rod 36 has in this instance a piston head on its end and this piston head is driven back and forth in cylinder 37 by fluid supplied by pipes 38 and 39 in the usual manner.

It is obvious that rods 36 could be joined by some sort of connecting means such as rings 19 of Figure 1 and that a single hydraulic cylinder could be used. Obviously an electric solenoid (not shown) or any other suitable motor means could be employed in place of hydraulic cylinders 37, and each desired hydraulic cylinder 37 could be a pneumatic cylinder.

Sleeve 33 could be made in sections, either short cylinder sections independently movable, or into arcuate sections independently movable, but I prefer to make the sleeve 33 in a single cylinder in order to reduce vibration. My invention lies in having sleeve 33 lie at all times in substantially the same cylinder plane as the surface of nacelle 3 or 28 and the rear portion of stationary cowling 8 or 31.

*Operation of Figure 1*

In Figure 1, sleeve 13 is closed in starting up engine 6 but as the engine tunes up sleeve 13 is drawn back by pulling on handle 26 and is left open, while taxiing the aircraft and while taking off. In flight, handle 26 is adjusted to keep the temperature of engine 6 at a proper level. In a multi-motored aircraft when one of the engines ceases to operate, the handle 26 on such engine may be pushed forward to close the space between 8 and 11 completely, thereby reducing parasitic drag caused by air passing around engine 6. On the other hand, the motors which are taking the added load may have their cowling 13 open wider and such wider opening of the cowling does not increase the parasitic drag as would be the case using the present type pivoted expanding flaps as explained above.

The operation of Figure 2 is similar to that of Figure 1 except that the operation of sleeve 33 may be performed by remote control by means of a fluid such as kerosene or glycerine being pumped in the proper pipe 38 or 39. It is contemplated that automatic thermal control of sleeve 33 may be achieved by thermostatic controlled motors driving pumps in pipes 38 and 39.

Obviously, numerous changes in design and construction of the parts for operating the cylinder sleeves may be made by those skilled in the art without departing from the present invention, the scope of which is defined only by the following claim.

Having described my invention, I claim:

An aircraft nacelle comprising in combination a first fixed element comprising a nacelle body having an inwardly tapered end, an engine mounted on said end, a second fixed element comprising a stationary cowling mounted in fixed spaced relationship to said nacelle body, said cowling extending around said engine, means controlling the flow of air between the stationary cowling and the nacelle body comprising a substantially cylindrical sleeve lying in substantially the same cylindrical plane as and movable relative to the outer surface of said stationary cowling, said sleeve being guided at all times by contact with at least one of said first and second fixed elements whereby fluttering is substantially suppressed, said sleeve being movable axially of the nacelle body from a position substantially completely closing the space between the stationary cowling and the nacelle body to a position allowing sufficient air flow through said space to effect substantial cooling of said engine, and remote control means for moving said sleeve comprising hydraulic cylinders secured to at least one of said fixed elements, a plurality of rods secured directly to said sleeve, and pistons mounted on said rods and received in said cylinders, said rods, pistons, and cylinders having their longitudinal axes substantially parallel to the axis of movement of said sleeve, whereby easy movement of said sleeve is obtained.

WILL D. PARKER.

REFERENCES CITED

The following references are of record in the file of this patent:

UNITED STATES PATENTS

| Number | Name | Date |
|---|---|---|
| 1,907,454 | Squires | May 9, 1933 |
| 2,081,762 | Nissen | May 25, 1937 |
| 2,124,333 | Duff et al. | July 19, 1938 |
| 2,175,535 | Mercier | Oct. 10, 1939 |
| 2,178,960 | Gagg | Nov. 7, 1939 |
| 2,212,094 | Adolph | Aug. 20, 1940 |
| 2,289,616 | Wojcik | July 14, 1942 |

FOREIGN PATENTS

| Number | Country | Date |
|---|---|---|
| 378,037 | Italian | Jan. 19, 1940 |
| 335,285 | British | 1930 |

OTHER REFERENCES

A. P. C. App. to Ramshorn, Ser. No. 326,141, filed Mar. 27, 1940, pub. May 11, 1943, Class 123-171A.